UNITED STATES PATENT OFFICE.

HOWARD L. MARSH, OF PHILADELPHIA, PENNSYLVANIA.

PROCESS OF INTRODUCING IRON INTO FOODS, DRUGS, AND BEVERAGES.

1,129,306.   Specification of Letters Patent.   Patented Feb. 23, 1915.

No Drawing.   Application filed December 5, 1914. Serial No. 875,553.

*To all whom it may concern:*

Be it known that I, HOWARD L. MARSH, a citizen of the United States, residing at Philadelphia, county of Philadelphia, and State of Pennsylvania, have invented a new and useful Improvement in Processes of Introducing Iron into Foods, Drugs, and Beverages, of which the following is a full, clear, and exact description.

The object of my invention is to introduce metals, and more particularly iron, into beverages, medicines and foods. The introduction of iron into such substances through the medium of inorganic compounds of iron is old and well known; but the serious objections thereto have been so well established and recognized and the supposedly good effects have been so counterbalanced by demonstrably harmful results that this method is generally deemed antiquated and impracticable.

Other methods of introducing iron into substances intended for human consumption have been devised which avoid the particular deleterious effects produced by inorganic iron compounds. Thus, solutions of compounds of iron and carbo-hydrates, and particularly a solution of the substance commonly known as ferric saccharate, have been utilized as agents for the introduction of soluble iron into foods, drugs and beverages; but this method is open to other objections, chief among which is that there is produced a turbidity or precipitate of both the iron and some of the ingredients of the beverage. This effect is probably due to the fact that a solution of ferric saccharate is not only colloidal but impure, since there is more or less free alkali present.

Another, and I believe better, method is set forth in my application Serial No. 879,013, filed December 26, 1914. This method comprises passing an electric current through an electrolyte of a solution of a refined carbo-hydrate, specifically saccharose, and through electrodes the anode of which is of iron. The resultant product, which also is colloidal, is more nearly free from impurities, as it contains nothing other than iron in some as yet not certainly known combination in solution in a solution of carbohydrate. When this substance is added to beer or other beverages in not too strong a solution, no permanent turbidity or precipitate is produced. It does, however, when added in too large a quantity to some beverages, produce a turbidity, and also a sweetish taste which is undesirable in some cases. The turbidity, however, is not a serious objection, as it may be removed by filtration and the iron present may remain in solution.

The object of my invention is to produce a substance still better adapted as a means of introducing soluble iron into foods, drugs and beverages. The substance produced by my new process is non-colloidal, does not cause turbidity or precipitation when added in any quantity to pure water or any beverage, is entirely devoid of a ferruginous taste and (when added in the desired solution) is practically devoid of any taste whatever. When freshly prepared and not diluted it possesses a slight odor of burnt sugar, which disappears upon dilution.

I have devised several alternative specific ways of carrying out the process, all, however, having certain features in common, but some having distinct advantages over others. These I shall describe in sufficient detail to enable any one skilled in the art to successfully practice them.

In the preferred embodiment of my invention, I take a solution containing a carbohydrate, preferably a solution of refined saccharose, and heat it under pressure to a high temperature. I then pass an electric current of appropriate strength and intensity through the substance as an electrolyte, employing as the electrodes, or as one of them, particularly the anode, the metal—ordinarily iron—which it is desired to introduce; this step of the process being substantially the process set forth in my said application Serial No. 865,687. A specific example of this preferable way of carrying out my process is as follows: 100 cc. of a saturated solution of saccharose was heated in an autoclave to a temperature of 300 degrees F. for a period of ten minutes. This resulted in partially caramelizing the solution, which had a wine color and an odor of burnt sugar. It was then introduced into a glass cell about 12.5 cm. deep, 6 cm. long and 1.7 cm. wide. The electrodes were of common sheet iron 4.5 by 11 cm. in size and were spaced apart a distance of about 1.5 cm. A direct current of about 110 volts was established in one instance for two hours and in another instance for twenty hours. The result in each instance was a substance which possessed the characteristics hereinbefore mentioned, being non-colloidal, tasteless and odorless, and producing no turbidity or precipitation when added to beverages. The amount of iron entering into the solution differed widely in the two cited instances, and much more iron than would be ordinarily necessary or desirable was added by means of the longer electrolytic action. With a given duration of electrolysis, however, a larger percentage of iron was added than if the initial heating under pressure at an elevated temperature had been omitted, and moreover the product was superior in being tasteless and in producing no turbidity even without filtration.

Almost equally good results are obtained if the two steps above mentioned are reversed, that is, if the iron is first introduced into the carbohydrate solution by electrolysis and is then subjected to the described heat treatment under pressure. Thus, 100 cc. of a solution of refined saccharose was subjected to the described electrolytic treatment, in accordance with the process set forth in my said application, thus producing an iron carbohydrate solution which I believe to be ferric saccharate for the reasons set forth in my said application. This solution was heated in an autoclave to a temperature of 260 degrees F. for a period of five minutes, thereby producing the desired product. I have also practised the last described process by following it with another electrolytic treatment.

It will therefore be understood that the order in which the two steps described of the process are carried out is not vital, and that either or both steps may be repeated; although, as above stated, I deem it best to practice first the heat treatment and then the electrolysis.

I am not prepared to assert with certainty the precise reactions that accompany the practice of my process. My theory, however, is that the successful result of the process depends upon the partial or complete breaking down of the carbohydrate molecule, by means of the heat applied under pressure, into various decomposition products, some of which are acid in character, and that the iron enters into combination with some or all of the organic acids formed and thus produces a stable combination of the same.

The successful practice of the process does not require for the heating step any precise degree of temperature continued for any definite time. Thus, with a lower temperature than that specified, but with the heating continued for a relatively longer time, the same result may be secured. So also, the heat treatment may be carried on at a somewhat higher temperature, in which case the time required would be relatively short. Again, I have found that a dilute solution of the carbohydrate or the substance which I desire to submit to this heat treatment requires either a higher temperature, or a temperature maintained for a longer time, than does a stronger solution. Furthermore, if the product has caramelized and undergone a considerable change by reason of relatively great heat treatment, it is essentially the same for the purpose desired as a product which has caramelized to a very slight extent. Judging from experience, however, I would say that the range of permissible temperatures would be between 212 degrees and 500 degrees Fahrenheit with the corresponding steam pressure, and that the greater the strength of the solution, the less the temperature required and the shorter the duration of the heat treatment.

I do not herein claim that part of my process which consists in passing an electric current through a solution of refined saccharose or other carbohydrate and through electrodes of which the anode is of iron or other metal to be introduced into the carbohydrate, as the same forms the subject matter of a separate application heretofore referred to, Serial No. 769,013, filed December 26, 1913.

Having now fully described my invention, what I claim and desire to protect by Letters Patent is:

1. The process of preparing a carbohydrate containing a metal in a soluble form which comprises the steps of subjecting a solution of a carbohydrate to heat and pressure and passing an electric current through an electrolyte of said solution and through electrodes the anode of which is of the said metal.

2. The process of preparing saccharate containing iron in a soluble form which comprises the steps of subjecting a solution of saccharose to heat and pressure and passing an electric current through an electrolyte of said solution and through electrodes the anode of which is iron.

3. The process of preparing a carbohydrate containing metal in a soluble form which comprises the steps of heating a solution of a carbohydrate to a temperature in excess of 212 degrees F. and passing an electric current through an electrolyte of said solution and through electrodes the anode of which is of the said metal.

4. The process of preparing a carbohydrate containing metal in a soluble form which comprises the steps of heating a solution of a carbohydrate to a temperature in excess of 212 degrees and under a pressure exceeding normal atmospheric pressure and passing an electric current through an electrolyte of said solution and through electrodes the anode of which is of the said metal.

5. The process of preparing a carbohydrate containing metal in a soluble form which comprises the steps of heating under pressure a solution of a carbohydrate to a temperature of approximately 300 degrees F. and passing an electric current through an electrolyte of said solution and through electrodes the anode of which is of the said metal.

6. The process of preparing a carbohydrate containing metal in a soluble form which comprises the steps of heating under pressure a solution of a carbohydrate to a temperature between 212 and 250 degrees F. and passing an electric current through an electrolyte of said solution and through electrodes the anode of which is of the said metal.

In testimony of which invention, I have hereunto set my hand, at Philadelphia, Pa., on this 25th day of November, 1914.

HOWARD L. MARSH.

Witnesses:
M. M. HAMILTON,
E. E. WALL.